United States Patent [19]
Kaub

[11] 3,963,100
[45] June 15, 1976

[54] INTERNAL SHOE DRUM
[75] Inventor: Manfred Kaub, Rhens, Germany
[73] Assignee: Girling Limited, Birmingham, England
[22] Filed: Feb. 26, 1975
[21] Appl. No.: 553,147

[30] Foreign Application Priority Data
Feb. 27, 1974 United Kingdom............... 8987/74

[52] U.S. Cl. ..................... 188/79.5 P; 188/196 BA
[51] Int. Cl.² .................................. F16D 65/56
[58] Field of Search................ 188/79.5 B, 79.5 M, 188/79.5 P, 79.5 GC, 79.5 GT, 106 A, 196 BA

[56] References Cited
UNITED STATES PATENTS
2,292,017    8/1942    Smith ........................... 188/79.5 B Primary Examiner—Duane A. Reger
Attorney, Agent, or Firm—Scrivener Parker Scrivener and Clarke

[57] ABSTRACT

The invention is an improved adjuster for a shoe drum brake of the type having an operating arm for mechanical operation pivoted to one of the shoes, a strut of adjustable length extending between the shoes and including a ratchet, and a pawl lever having a first arm carrying a pawl cooperating with said ratchet, a second arm engaging the end of the strut, and biasing means urging the second arm into permanent engagement with the end of the strut to urge it axially into engagement with the operating arm.

8 Claims, 4 Drawing Figures

INTERNAL SHOE DRUM

This invention relates to internal shoes drum brakes.

Such brakes are known which comprise a pair of opposed brake shoes, an actuator engaging one pair of adjacent ends of the brake shoes, mechanically operated brake means having an operating arm pivotally mounted on one shoe and an adjustable strut connected between the operating arm and the other shoe, and a pawl and ratchet means for effecting adjustment of the strut length to compensate for excess wear of the brake shoes.

In one previously proposed form of brake the pawl and ratchet means comprises a pawl rigidly attached to the said other brake shoe and a ratchet wheel rotatably mounted on the strut and engaged by the pawl for adjustment of the length of the strut. The strut is biased towards the said one shoe by a spring, the force of which is removed when a predetermined temperature is reached to prevent overadjustment. When the spring bias is removed the strut can move freely axially with the disadvantage that some rattle may occur.

In accordance with the present invention, there is provided an internal shoe drum brake comprising a pair of opposed brake shoes, an actuator engaging one pair of adjacent ends of the brake shoes, mechanically operated brake means having an operating arm pivoted in one shoe and an adjustable length strut connected between the other shoe and the operating arm, and a pawl lever pivotally mounted on said other shoe and engaging a ratchet wheel rotatably mounted on the strut for effecting adjustment of the strut length to compensate for even wear of the brake shoes.

The pawl lever is preferably biased at all times towards the strut so that the strut is always held in engagement with the pawl lever and with the operating arm to prevent any free axial movement of the strut.

Preferably, the pawl lever is biased by a spring, for example a coil tension spring or a leaf spring, which yields to prevent overadjustment of the strut.

Some forms of vehicle wheel internal shoe drum brakes in accordance with the invention will now be described, by way of example, with reference to the accompanying drawings, in which.

In the following description corresponding parts of the brakes have been allotted the same reference minerals.

Each of the brakes comprise a pair of opposed arcuate brake shoes 1, 2 having one pair adjacent ends engaging an abutment 3 and the other pair engaging an actuator 4 for service brake operation. One or more shoe return springs 5 bias the shoes towards each other.

Figure 1:
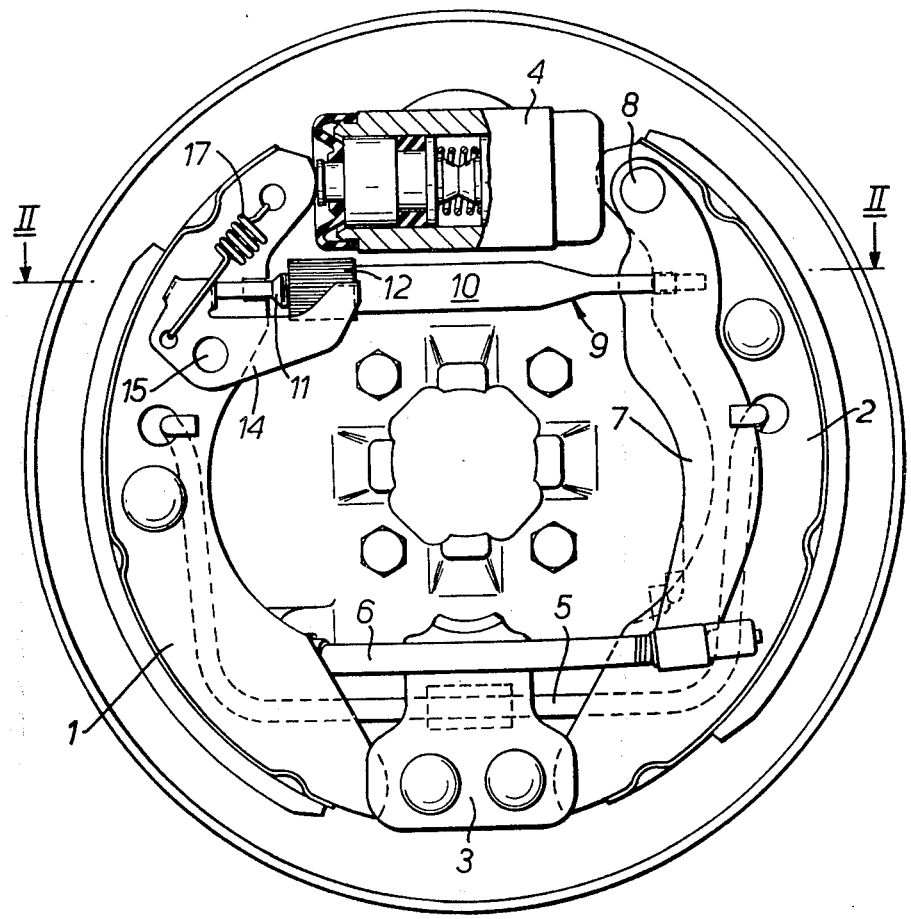
FIG. 1 is a side view of one form of brake.
Figure 2:
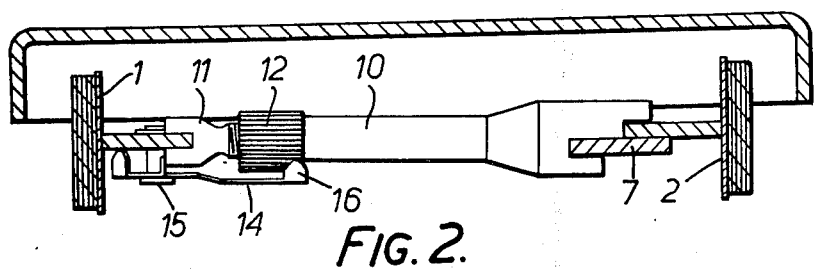
FIG. 2 is a section taken along the line II—II of FIG. 1.

As can be seen in FIG. 1, a handbrake cable 6 is connected to one end of an operating arm 7, the other end of which is mounted at one end of the trailing shoe 2 on a pivot pin 8. The arm 7 engages one end of an adjustable strut 9 which comprises a tubular part 10 receiving a threaded part 11 on which is rotatably mounted a nut 12 having ratchet teeth around its circumference, rotation of the nut varying the length of the strut. The threaded part 11 of the strut 9 engages the leading shoe 1 and a pawl lever 14 which is mounted on a pivot pin 15 on the leading shoe. The pawl lever 14 is a bell-crank lever, one arm of which has a pawl 16 co-operating with the ratchet teeth and the other arm of which is biased into engagement with the end of the strut by a coil tension spring 17 acting between the pawl lever and the leading shoe 1.

In operation of the service brake, the actuator 4 forces the shoes 1 and 2 apart against the bias of the shoe return spring 5 and the pawl lever 14 rotates clockwise relative to the shoe 1 about the pin 15 under the action of spring 17. The nut 12 can be rotated by the pawl 16 to adjust the length of the strut if the wear of the brake is sufficient. Upon release of the actuator the brake shoes are pulled towards each other by the return spring 5 and the pawl lever 14 rotates anti-clockwise relative to the shoe 1. If sufficient wear of the shoes has occurred the pawl lever 14 picks up a fresh ratchet tooth.

It will be seen that the pawl lever at all times engages the end of the strut 9 under the bias of spring 17, the strut being held against axial movement between the pawl lever 14 and the operating arm 7. Furthermore, if the resistance to rotation of the nut 12 is great enough, the spring 17 yields to prevent further adjustment of the strut when the force required to rotate the nut exceeds a predetermined value.

In the operation of the handbrake, the operating arm 7 is rotated clockwise about the pivot pin 8 and, through the strut 9, urges the leading shoe 1 into engagement with the drum. The operating arm 7 then pivots about the strut 9 to apply the trailing shoe 2.

Figures 3, 4:
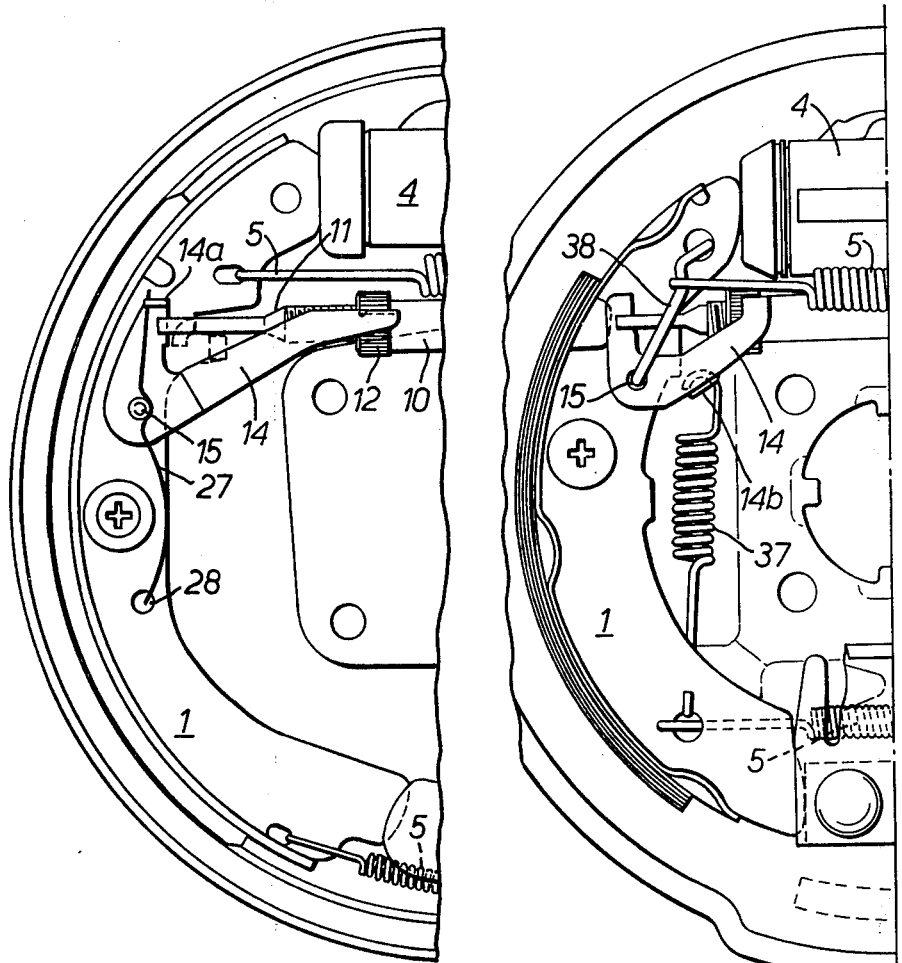
FIGS. 3 and 4 are partial side views of the other forms of brake.

FIG. 3 shows a modification in which the coil tension spring 17 is replaced by a leaf spring 27 which is attached at one end to the shoe 1 by a projection extending through an aperture 28 in the shoe and abuts at its other end an upturned shoulder 14a on the pawl lever 14. The spring is linked around the pivot pin 15.

In the form of brake illustrated in FIG. 4, the pawl lever 14 is biased by a coil tension spring 37 extending generally perpendicular to the strut 9 and acting between a projection 14b on the pawl lever and the shoe 1. The brake return spring 5 adjacent the actuator 4 acts between the shoe 2 and a metal rod 38 secured at one end in an aperture in pivot pin 15 and at its other end in an aperture in the shoe 1. This arrangement permits both the spring 5 and the strut 9 to lie closely adjacent the actuator 4.

Operation of the brakes illustrated in FIGS. 3 and 4 is generally similar to the operation of the brake of FIG. 1.

I claim:

1. An internal shoe drum brake comprising first and second opposed brake shoes having adjacent ends, an actuator engaging one pair of said adjacent ends of said brake shoes, mechanically operated brake means having an operating arm pivoted on said first shoe and an adjustable length strut having first and second opposed ends respectively in operative engagement with said second shoe and said operating arm, a pawl lever pivotally mounted on said second shoe and having a first arm carrying a pawl and a second arm, a ratchet wheel rotatably mounted on said strut and engaged by said pawl for effecting adjustment of the strut length to compensate for excess wear of said brake shoes, and biasing means biasing the second arm of said pawl lever into permanent engagement with said strut to urge the latter axially in the direction of said operating arm whereby movement of said second shoe relative to said strut effects pivotal movement of said pawl lever.

2. A brake according to claim 1, wherein said biasing means comprises a spring which is separate from said pawl lever and which is yieldable to prevent overadjustment of said strut.

3. A brake according to claim 1, including a pivot pin pivotally securing said pawl lever to said second shoe, wherein said biasing means comprises a leaf spring having one end connected to said pawl lever and the other end connected to said second shoe, said spring engaging intermediate its ends said pivot pin.

4. A brake according to claim 2, wherein said spring yields when the force applied by said pawl lever to rotate said ratchet wheel reaches a predetermined value.

5. A brake according to claim 1 wherein said biasing means comprises a coil tension spring connected between said pawl lever and said second brake shoe.

6. A brake according to claim 5, wherein said spring extends substantially perpendicular to said strut on one side thereof opposite to said actuator.

7. A brake according to claim 1, including a brake return spring extending generally parallel with said strut, and a member mounted on said second shoe having a portion spaced from said second shoe, wherein one end of said return spring is connected to said portion.

8. A brake according to claim 7, wherein said member is a rod having one end connected to said second shoe at the pivot of said pawl lever and the other end secured to second shoe.

* * * * *